UNITED STATES PATENT OFFICE

WERNER SCHULEMANN, OF ELBERFELD-VOHWINKEL, AND FRITZ SCHÖNHÖFER, OF ELBERFELD, GERMANY, AND AUGUST WINGLER, OF WESTFIELD, NEW JERSEY, ASSIGNORS TO WINTHROP CHEMICAL COMPANY, INC., OF NEW YORK, N. Y., A CORPORATION OF NEW YORK

SOLUBLE SALTS OF ORGANIC BASES AND THE PROCESS OF PREPARING THE SAME

No Drawing. Application filed July 7, 1928, Serial No. 291,136, and in Germany August 16, 1927.

The present invention concerns sparingly soluble salts of organic bases (the term organic bases is intended to include bases e. g. amino quinolines and basic compounds, like the alkaloids) with the methylene compounds of aromatic acids e. g. carboxylic- or sulfonic acids and derivatives and substitution products thereof.

The salts of organic bases with inorganic acids often show the inherent great disadvantage of being deliquescent and oxidizable in the air. Salts of this kind are, moreover, usually readily soluble in water and possess an unpleasant bitter taste, especially the salts of the alkaloids, so that also on this account their technical application, for example for pharmaceutical purposes, is often rendered impossible.

In accordance with the present invention non-hygroscopic salts of organic bases of the most varied kind, such as for example aminoquinoline, quinine, strychnine and the like, which are extremely stable in the air are obtained by forming salts of these substances with the methylene compounds of aromatic acids e. g. carboxylic- or sulfonic acids and derivatives and substitution products thereof, such as for example, methylene dihydroxy-$\beta$-naphthoic acid and methylene disalicylic acid.

The salts of the said acids with organic bases and alkaloids are generally yellowish products sparingly soluble in water and tasteless; they are readily decomposed by acids or alkalies into their components and are consequently well suitable for technical or pharmaceutical use. They are soluble in alcohol, acetone, methyl alcohol.—The manufacture of these salts is carried out in the customary manner, for example, by combining equivalent quantities of the hydrochlorides of the organic bases or of the alkaloids with the sodium salt of the aromatic acid in a suitable solvent, for example, water, the salt is precipitated as a sparingly soluble compound. In this manner not only neutral but also acid salts can be obtained.

The following examples will illustrate our invention:—

*Example 1.*—221 parts by weight of 1-(N-methyl-N-diethyl-aminoethyl)-amino-4-aminobenzene are dissolved in 4000 parts by weight of $$\frac{n}{2}$$

hydrochloric acid and combined whilst stirring well with a solution of 288 parts by weight of methylene disalicylic acid in 4000 parts by weight of $$\frac{n}{2}$$

caustic soda. An almost white salt having the probable formula:

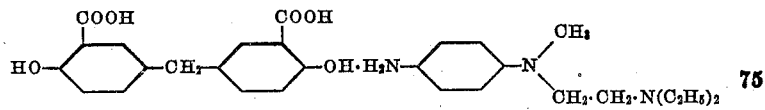

is precipitated, then filtered, washed repeatedly with water and dried. In contradistinction to the extremely deliquescent and readily oxidizable hydrochloride it remains unchanged in the air and is almost tasteless.

*Example 2.*—220 parts by weight of (N-ethyl-N-diethyl-aminoethyl)-aniline are dissolved in 4000 parts by weight of $$\frac{n}{2}$$

hydrochloric acid and combined whilst stirring well with a solution of 388 parts by weight of methylene di-β-hydroxynaphthoic acid (compare Berichte der Deutschen Chemischen Gesellschaft, vol. 34 (1901), page 4162 in 4000 parts by weight of $$\frac{n}{2}$$

caustic soda. The pale yellowish salt of the probable formula:

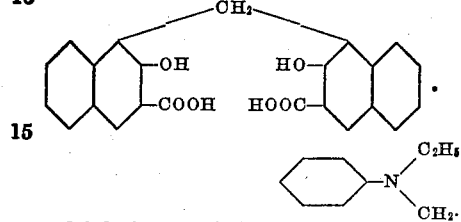

which is precipitated, is filtered, washed repeatedly with water and dried. In contradistinction to the hydrochloride which deliquesces in the air, it is stable and tasteless.

*Example 3.*—351 parts by weight of 1:2-dimethoxy - 4 - N - di - (diethylaminoethyl) - aminobenzene are treated with 388 parts by weight of methylene di-β-hydroxy-naphthoic acid as in Example 2 and yield a solid salt of the probable formula:

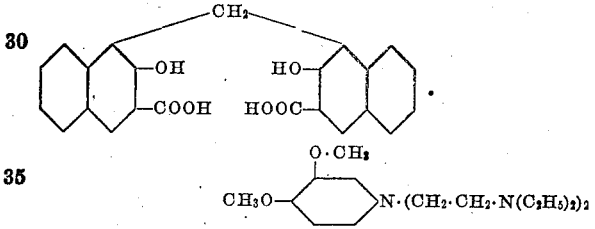

which is soluble in water and in contradistinction to the deliquescent hydrochloride remains unchanged in the air and is tasteless.

*Example 4.*—273 parts by weight of 6-methoxy-N - (diethylaminoethyl) -8-aminoquinoline are treated with 388 parts by weight of methylene-di-β-hydroxynaphthoic acid as in Example 2 and yield a solid, yellowish salt of the probable formula:

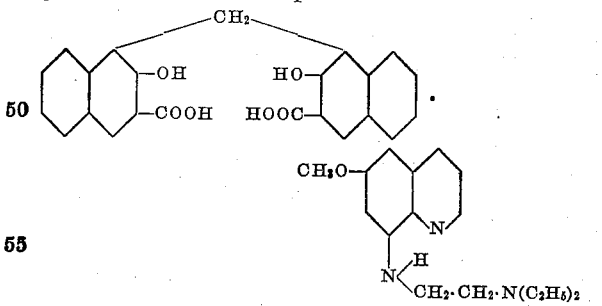

which is sparingly soluble in water and in contradistinction to the hygroscopic hydrochloride remains unchanged in the air and is tasteless.

*Example 5.*—315 parts by weight of 6-methoxy - N - (α - diethylamino-δ-methylbutyl) -8-aminoquinoline are treated with 388 parts by weight of methylene di-β-hydroxy-naphthoic acid as in Example 2 and yield a solid, yellowish salt of the probable formula:

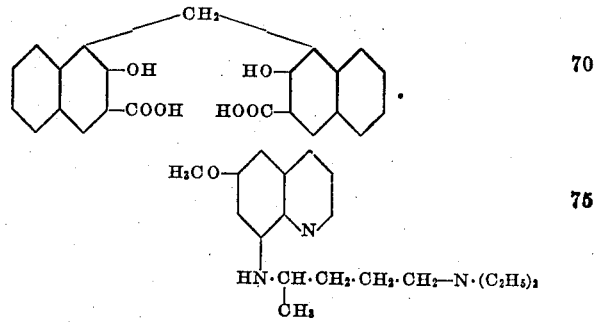

which is almost insoluble in water and in contradistinction to the deliquescent hydrochloride remains unchanged in the air and is tasteless.

*Example 6.*—361 parts by weight of β-diethylamino - β' - (6-methoxy-quinolyl-8-amino)-glycol-diethylether are treated with 388 parts by weight of methylene-di-β-hydroxynaphthoic acid as in Example 2 and yield a solid yellowish salt of the probable formula:

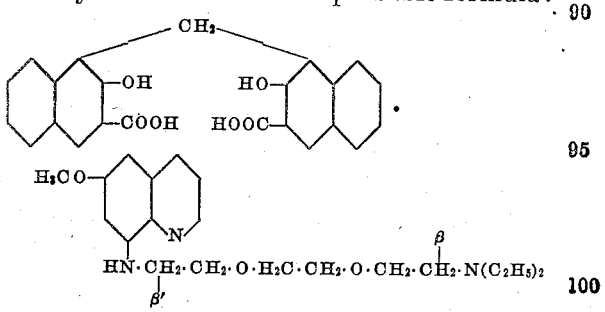

which is sparingly soluble in water and in contradistinction to the deliquescent hydrochloride is stable in the air and tasteless.

*Example 7.*—174 parts by weight of 6-methoxy-8-amino-quinoline are dissolved with heating in 2000 parts by weight of $$\frac{n}{2}$$

hydrochloric acid and combined with 194 parts by weight of methylene-di-β-hydroxy-naphthoic acid dissolved in 2000 parts by weight of $$\frac{n}{2}$$

caustic soda. The yellow salt of the probable formula:

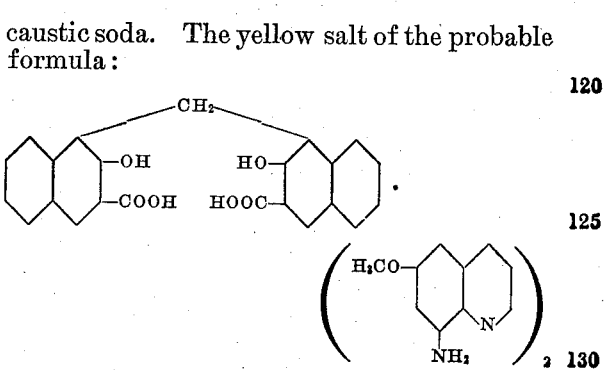

which is precipitated, is sparingly soluble in water, stable in the air and tasteless.

*Example 8.*—40 parts by weight of methylene-di-β-hydroxynaphthoic acid are dissolved with warming in 2000 parts by weight of $\frac{n}{10}$ *n*-caustic soda, the solution is filtered and entered into a solution of 79 parts by weight of quinine hydrochloride in water. An almost colorless precipitate of the probable formula:

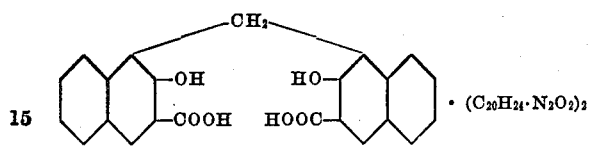

is formed, which is filtered, washed with water and dried at a low temperature. Thus is obtained a colorless, nearly tasteless powder, almost insoluble in water and containing 62.8% of quinine.

It thus possesses a considerably higher quinine content than the quinine tannate (also sparingly soluble and tasteless) which according to its composition

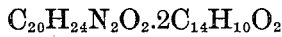

(Schmidt, Lehrbuch der Pharmazeutischen Chemie, 5th edition, 1910, vol. 2, page 1783) only contains 30–32%.

By using instead of the quinine other cinchona or a solution of the total alkaloids of cinchona bark the same process yields the corresponding methylene di-β-hydroxynaphthoic acid salts, which in appearance and physical properties resemble that of quinine.

*Example 9.*—397 parts by weight of strychnine nitrate are dissolved in water and combined while stirring with a solution of 194 parts by weight of methylene di-β-hydroxynaphthoic acid in 2000 parts by weight of

caustic soda. The white salt precipitated of the probable formula:

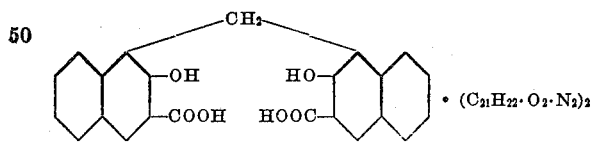

is filtered, washed and dried. In contradistinction to strychnine nitrate it is sparingly soluble in water and quite tasteless.

We claim:—

1. In the process for the manufacture of sparingly soluble salts of organic bases, the step which comprises allowing to react an organic base with a methylene compound of an acid of the group consisting of aromatic-sulfonic and carboxylic acids.

2. In the process for the manufacture of sparingly soluble salts of bases, the step which comprises allowing to react an organic base with methylene-di-β-hydroxynaphthoic acid.

3. In the process for the manufacture of the salt of 6-methoxy-N-(α-diethylamino-δ methylbutyl)-8-aminoquinoline with methylene-di-β-hydroxy-naphthoic acid, the step which comprises allowing to react these two products one with the other.

4. In the process for the manufacture of the salt of 6-methoxy-N-(α-diethylamino-δ methylbutyl)-8-aminoquinoline with methylene-di-β-hydroxy-naphthoic acid, the step which comprises treating the hydrochloride of the base with an alkali metal salt of the acid in aqueous solution.

5. The new sparingly soluble salts of an organic base with a methylene compound of an acid of the group consisting of aromatic, sulfonic and carboxylic acids being generally whitish to yellowish powders having not a sharp melting point, being soluble in ethyl alcohol, acetone, methylalcohol and being almost insoluble in water and being valuable pharmaceutical products.

6. The salt of 6-methoxy-N(α-diethylamino-δ-methylbutyl)-8-aminoquinoline with methylene-di-β-hydroxynaphthoic acid having most probably the formula:

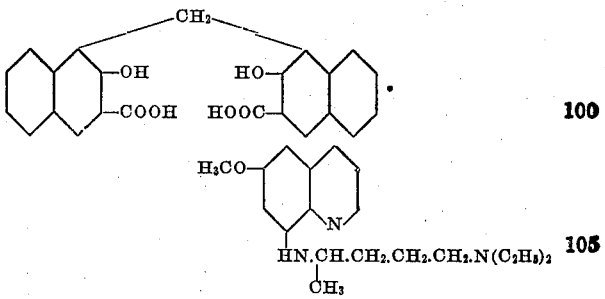

being a solid yellowish salt almost insoluble in water, being tasteless and remaining unchanged in the air.

7. The new sparingly soluble salts of an organic base derived from an aminoquinoline with a methylene compound of an acid of the group consisting of aromatic sulfonic and carboxylic acids, being generally whitish to yellowish powders having not a sharp melting point, being soluble in ethyl alcohol, acetone, methylalcohol and being almost insoluble in water and being valuable pharmaceutical products.

8. The new sparingly soluble salts of an 8-aminoquinoline substituted in the amino group by a basic group with a methylene compound of an acid of the group consisting of aromatic sulfonic and carboxylic acids, being generally whitish to yellowish powders having not a sharp melting point, being soluble in ethyl alcohol, acetone, methylalcohol and being almost insoluble in water and being valuable pharmaceutical products.

9. The new sparingly soluble salts of an 8-aminoquinoline substituted in the amino group by a basic group with methylene-di-β-hydroxynaphthoic acid, said products being generally whitish to yellowish powders having not a sharp melting point, being soluble in ethyl alcohol, acetone, methylalcohol and being almost insoluble in water and beng valuable pharmaceutical products.

10. The new salt of β-diethylamino-β'-(6-methoxyquinolyl-8-amino)-glycol-dithylether with methylene-di-β-hydroxynaphthoic acid having most probably the formula:

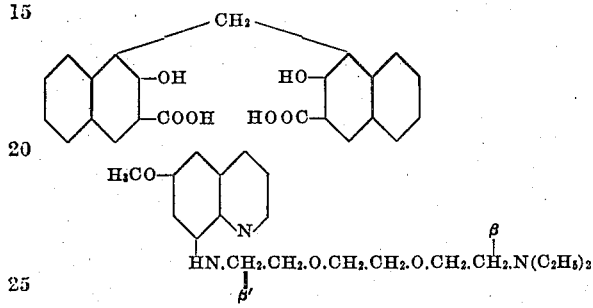

said product being a solid yellowish salt, sparingly soluble in water, being stable in the air and tasteless.

11. The new salt of strychnine with methylene-di-β-hydroxynaphthoic acid having most probably the formula:

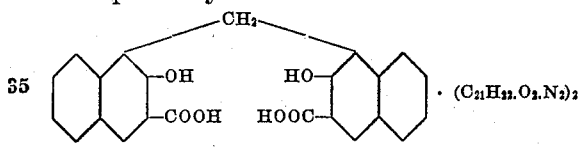

said product being a white salt sparingly soluble in water and tasteless.

In testimony whereof we have hereunto set our hands.

WERNER SCHULEMANN. [L. S.]
FRITZ SCHÖNHÖFER. [L. S.]
AUGUST WINGLER. [L. S.]